July 29, 1969  E. F. HEISER  3,457,765
ADAPTER CUSHION

Filed Sept. 30, 1966  2 Sheets-Sheet 1

INVENTOR.
ELMER F. HEISER
BY
YOUNT, RANEY, FLYNN, & TAROLLI
ATTORNEYS

July 29, 1969  E. F. HEISER  3,457,765
ADAPTER CUSHION

Filed Sept. 30, 1966  2 Sheets-Sheet 2

INVENTOR
ELMER F. HEISER
BY
YOUNT, RANEY, FLYNN, & TAROLLI

ATTORNEYS

United States Patent Office 3,457,765
Patented July 29, 1969

3,457,765
ADAPTER CUSHION
Elmer F. Heiser, 5880 Lotusdale Drive,
Parma Heights, Ohio 44130
Filed Sept. 30, 1966, Ser. No. 583,253
Int. Cl. B21j 7/12
U.S. Cl. 72—432          13 Claims

ABSTRACT OF THE DISCLOSURE

An adapter cushion for a press or the like having individual cylinder-and-piston units spaced apart by the distances between evenly-spaced die pin locations. A plate assembly provides passages interconnecting the cylinders so that the cylinders which are located where die pins are not present provide surge/compression chambers for the other cylinder-and-piston units. Each piston has an exposed central projection which is positioned for engagement by the respective die pin.

This invention relates to a yieldable loading device employing fluid pressure cylinders, commonly known as an adapter cushion, for use on a workpiece forming apparatus, such as a sheet metal forming press, to yieldably load a workpiece-engaging member, such as a part of a die, to maintain pressure on it but yet allow it to move relative to another workpiece-engaging member during a forming operation.

The present invention is particularly useful in sheet metal forming presses. In such presses, certain workpiece-engaging elements, such is dies, workpiece holders, and pressure pads, are designed to exert a pressure on a workpiece but are supported so that during the forming operation they will yield relative to the part of the press which supports the elements and relative to other workpiece-engaging elements, while maintaining the pressure on the workpiece. In certain sheet metal forming presses, the elements which are to apply a pressure while moving relative to their support have been provided with a plurality of die pins for engagement with a cushioning arrangement.

The die pins in a die apparatus are, by industry standards, positioned on respective ones of pin centers which are arranged in the form of a grid six inches apart. The number and location of the die pins will vary from one die apparatus to the next depending upon the particular workpiece forming operation to be performed. In the usual practice there are probably pins at no more than about 35% of the pin centers.

In the conventional practice, die pins extend from the die to engage one side of a cushioning plate which is cushioned by one or more air or hydraulic cylinders. In certain known apparatus, a plurality of cushioning plates or members are each cushioned by one or more die or hydraulic cylinders with each plate or member being aligned with a plurality of pin centers, while in other known apparatus a single plate is engaged by all die pins, regardless of the pin centers on which they are located, and the plate is cushioned for yielding movement by a plurality of cylinders. One problem in any such apparatus is that the pins normally apply unbalanced forces to the pistons of the cylinders.

In another type of apparatus relatively large air cylinders corresponding in number to the die pins are moved to position the cylinders so that there is a piston in alignment with each die pin. Each time the die pin arrangement is changed, as on a changing of dies, the cylinders are changed so that their number and location in the cushion is such that there is a die pin opposite to each cylinder. Moreover, the cylinders are connected to a surge tank to provide proper operation during cushioning. This arrangement requires the moving of the cylinders each time a change in die pin location occurs. Moreover, the size of the cylinders and the need for a surge tank or tanks and for connections thereto from each cylinder provide space problems and problems of strength when the necessary space is provided to accommodate the piping, tanks, etc.

Other disadvantages in certain known arrangements have been the relatively short working stroke of the pistons compared to the overall vertical thickness of the cushion assembly, and in most cases the use of a cast frame for attaching the die to the cushion and the cushion to the press ram.

The present invention is directed to a novel and improved adapter cushion for a press or the like which overcomes these difficulties and disadvantages of the prior types of cushion arrangements.

It is an object of this invention to provide a novel and improved adapter cushion for a press or the like which will operate properly regardless of the distribution of the die pins in the press.

Another object of this invention is to provide a novel and improved adapter cushion for a press or the like which provides a longer working stroke of its fluid-cushioned pistons for a given overall vertical thickness of the cushion assembly.

Another object of this invention is to provide a novel and improved adapter cushion for a press or the like which has a plurality of cylinder-and-piston units evenly spaced apart in a grid-like pattern and positioned at each location where a die pin may appear and having pistons arranged for direct engagement with the die pins.

Another object of this invention is to provide an adapter cushion as just stated which has the cylinders interconnected with each other so that those cylinders which are located where die pins are not present act as surge/compression chambers for the cylinders which are located where die pins are present.

Another object of this invention is to provide such an adapter cushion having an outer plate with recesses for properly locating the cylinders and passages for interconnecting the cylinders for the just-described surge/compression action.

Another object of this invention is to provide a novel and improved adapter cushion for a press or the like which does away with the previously-required surge/compression tanks external to the cylinders and the pipes or hoses connecting the cylinders to such tanks.

Another object of this invention is to provide an improved adapter cushion having a novel and simplified construction for both supporting the ends of the cylinders which are disposed toward the die pins and providing limit stops for the respective pistons in their extended positions.

Another object of this invention is to provide a novel and improved adapter cushion for a press or the like which does not require castings or patterns and which may be made readily and inexpensively to any desired size.

Further objects and advantages of the present invention will be apparent from the following detailed description of a presently-preferred embodiment, which is illustrated in the accompanying drawings.

Figure 1:
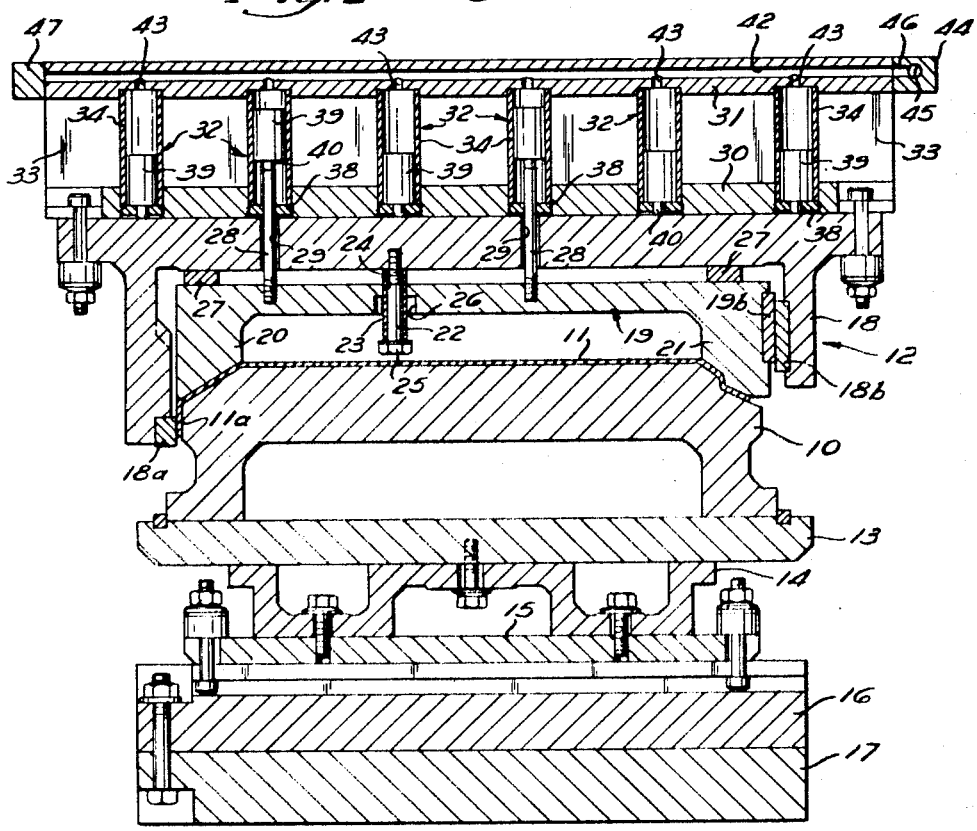
FIGURE 1 is a vertical section through a press having the present adapter cushion coacting with the upper die of the press.

In FIGURE 1 of the drawings the adapter cushion of the present invention is shown applied to a conventional sheet meetal stamping press having a fixed lower die member 10, which receives a sheet 11 to be worked upon, and a vertically reciprocable upper die assembly 12 which cooperates with the fixed lower die member to form the sheet.

The lower die member 10 rests on a lower support plate 13 which is bolted to a support member 14 which, in turn, is bolted to a bottom plate 15. The bottom plate 15 is bolted to a bolster 16 which is bolted to the press bed 17.

The upper die assembly 12 comprises a pair of upper die members 18 and 19. The die member 19 has depending, marginal, work-engaging portions 20, 21 which normally project below the die member 18 to engage and hold the sheet 11 against the lower die member 10, and also to partially form and/or "set" portions of the sheet which were partially formed in a previous operation, before the work-engaging portions of the die member 18 engage the sheet. The die member 19 is suspended from the die member 18 by shoulder screws 22 threadedly secured to the underside of the die member 18 and each carrying a guide sleeve or bushing 23 which extends loosely through a corresponding vertical opening 24 in the pressure pad. Each shoulder screw 22 has a head 25 on its lower end which seats in a counterbore 26 at the underside of the die member 19 to define a downward limit stop of die member 19 with respect to die member 18 when the die is open. FIGURE 1 shows the position of the parts after the die has closed, with the die member 18 having moved downward with respect to the die member 19 to engage and form the sheet 11. Die member 18 carries inserts 18a for engagement with the sheet 11 at its periphery to bend it down over the lower die member, as shown at 11a in FIGURE 1. This action is commonly called "wiping." Abutment plates 27 rest on top of the die member 19 for engagement by the die member 18 when the die is closed, as shown in FIGURE 1.

The die members 18 and 19 carry confronting wear plates 18b and 19b which are located, respectively, on the inside of die member 18 and the outside of die member 19 and which slidably engage each other to guide the movements of die members 18 and 19 with respect to one another.

In accordance with the usual practice, a plurality of upstanding pins 28 extend vertically up from the die member 19 loosely through corresponding openings 29 in the die member 18. These pins 28 may be threadedly secured to the die member 19, as shown, or they may simply have their lower ends abut against the top of the die member 19. The number and location of these upstanding die pins 28 will vary, depending upon the nature of the sheet forming operation and the anticipated distribution of the working load on the die member 19. However, the die pins, under the established practice, will be spaced apart 6 inches between centers, or a multiple thereof, in both the X and Y coordinate directions (i.e., from side-to-side and from front-to-back, respectively, in FIG. 1) in a horizontal plane. That is, any two neighboring die pins along either coordinate direction may be as close as, but not closer than, six inches apart, or they may be twelve, eighteen, twenty-four or some other multiple of six inches apart.

In accordance with the present invention, a novel adapter cushion is provided for coaction with these die pins to provide yieldable cushioning of the die member 19 after it has engaged the sheet 11 and while the die is continuing to close.

Figure 2:
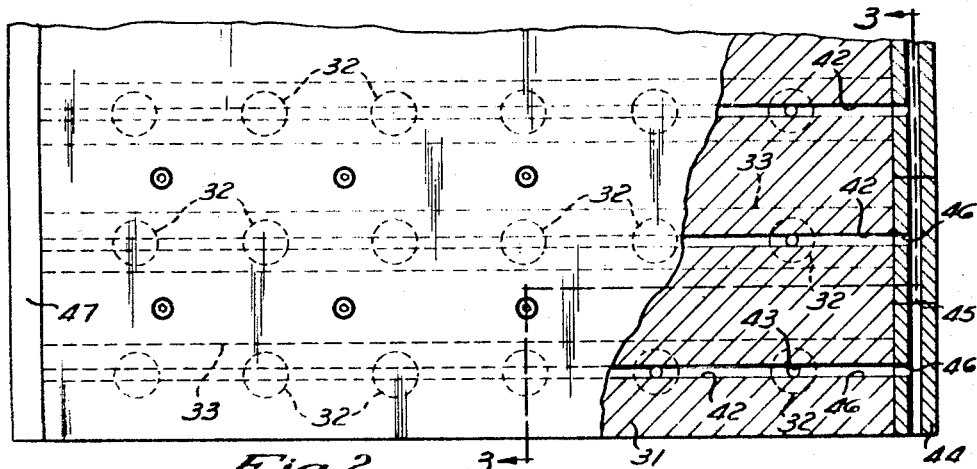
FIGURE 2 is a top plan view of this adapter cushion, with parts broken away for clarity.

Referring to FIGS. 1 and 2, this adapter cushion comprises a lower horizontal plate 30, which is bolted to the top of the die member 18, an upper horizontal plate 31 spaced above the lower plate and detachably secured, such as by bolts, to a vertically reciprocable ram (not shown) in the press, a plurality of rows of vertically disposed cylinder-and-piston units 32 disposed between these plates, and rigid spacer bars 33 engaged between the upper and lower plates between successive rows of the cylinder-and-piston units 32 from front to back in FIG. 1. As best seen in FIG. 2, the cylinder-and-piston units 32 are arranged in a grid-like pattern in which they are spaced apart in succession from left to right six inches from center-to-center and in succession from front to back six inches from center-to-center. Thus, there is a cylinder-and-piston unit 32 at every location where a die pin 28 may possibly be present, and in any given installation, there will be several cylinder-and-piston units 32 at locations where a die pin 28 will not be present because it will not be necessary to have a die pin at each six-inch location in both coordinate directions.

Figure 3:
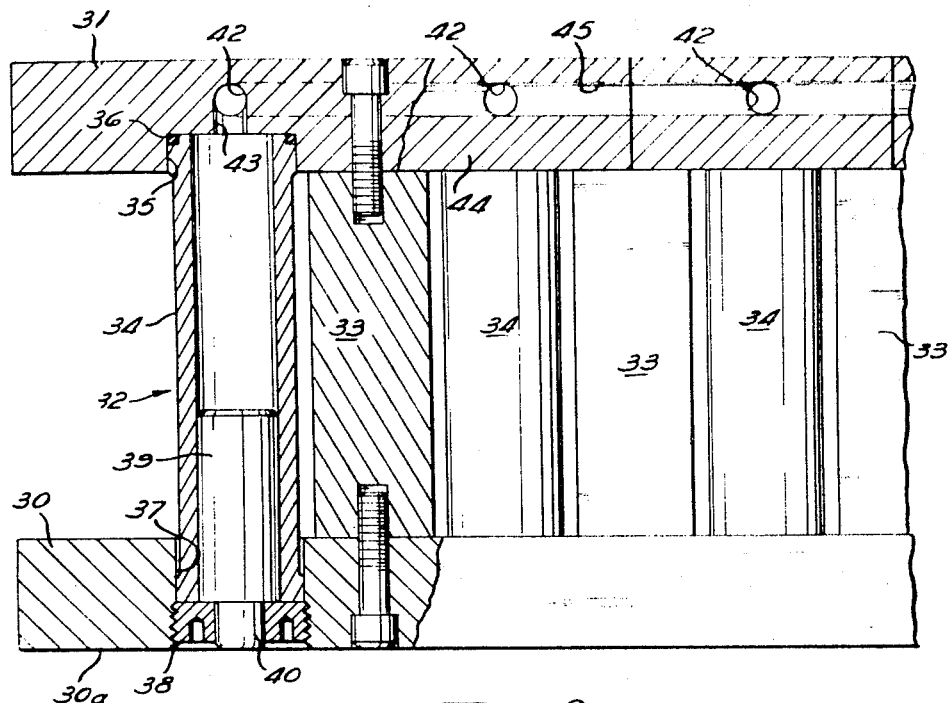
FIGURE 3 is an enlarged vertical section through this adapter cushion, taken along the line 3—3 of FIG. 2.

As best seen in FIG. 3, each cylinder-and-piston unit 32 includes a cylinder 34 whose upper end is snugly seated in a respective downwardly-facing counterbore 35 in the upper plate 31 and sealed thereat by an O-ring 36. The lower end of the cylinder 34 is snugly received in the upper end of a bore 37 in the lower plate 30. The lower end of this bore 37 is screw-threaded and receives a spanner nut 38 which abuts against the lower end of the cylinder 34. The several bores 37 in the lower plate form a grid-like pattern of openings which are on centers spaced apart from each other by six inches.

The cylinder 34 slidably receives a piston 39, which may have a suitable fluid-sealing arrangement (not shown) for sealing engagement with the inside of the cylinder. The piston 39 carries a downwardly-projecting rod 40 which normally extends with a suitable clearance down through the central opening in the spanner nut 38. As shown in FIG. 3, the upper end of the spanner nut 38 provides a lower limit stop for the respective piston 39, as well as a support for the lower end of the respective cylinder 34. When the piston is in its normal downward position, as shown in FIG. 3, the lower end of its rod 40 is substantially coplanar with the horizontal bottom face 30a of the lower plate 30 in the adapter cushion.

Referring to FIG. 2, the upper plate 31 of the adapter cushion has a plurality of drilled horizontal passages 42, which are spaced apart from front to back on this plate and each extending from left to right across the full width of the plate. Each of these passages 42 is in fluid communication with an entire row of the cylinder-and-piston units 32. As shown in FIGS. 2 and 3, the upper plate 31 of the adapter cushion has a plurality of short vertical bores 43 extending down from the passages 42 into the upper ends of the respective cylinders 34.

At the right side of the adapter cushion in FIGS. 1 and 2, manifold plates 44 are bolted to the top plate 31. These manifold plates 44 are arranged end-to-end from front to back of the adapter cushion and they present manifold passages 45 which register with one another to provide a continuous passage extending from front to back and communicating with each of the passages 42 through a cross bore 46 in the respective manifold plates 44. One end of this manifold passage is closed and suitable pressurized fluid, preferably gaseous nitrogen, may be introduced into the other end until the desired pressure has been established in the cylinders. At the left side of the adapter cushion in FIGS. 1 and 2, an end plate 47 is bolted to the upper plate 31 and is sealed thereto in fluid-tight fashion to close these ends of the passages 42. Each manifold plate 44 may be removed individually to check the corresponding row of cylinders 34 for leaks.

Alternatively, however, in place of the manifold plate passages 45, the several passages 42 in the adapter cushion may be interconnected by drilled passages extending from front to back in the upper plates 31 of the adapter cushion.

In the operation of this adapter cushion, suitable pressurized fluid (preferably nitrogen) is introduced into the manifold passage 45 until the desired fluid pressure is established in all of the cylinders 34, passages 42 and passage 45, which are all in continuous fluid communication with one another. Then the inlet end of the manifold passage 45 may be closed to hold the pressurized fluid inside this closed system of interconnected passages and cylinders. For example, the normal pressure in the cylinders and passages (i.e., when the pistons 39 are all down) may be approximately 1000 pounds per square inch, using nitrogen as the pressure fluid. The pressure is preferably at least greater than 180 p.s.i.

Before the upper die assembly 12 of the press is moved down toward the workpiece 11, the die member 19 will be suspended in spaced relationship below the die member 18, with the upper end of each counterbore 26 in the pressure pad resting on the head 25 of the respective shoulder screw 22. In this position of the parts of the upper die assembly 12, the upper ends of the die pins 28 are spaced below the lower ends of the piston rods 40 by a very small clearance. Every piston 39 in the adapter cushion will be in its lowermost position in the respective cylinder 34, resting on top of the respective spanner nut 38.

When the upper die means 12 is lowered by the press ram toward the lower die member 10 having the workpiece sheet 11 thereon, the die member 19 first engages the sheet 11, for the purposes already described, and this engagement stops the downward movement of the die member 19. The die member 18 continues to move downward relative to the stationary lower die member 10 and relative to the now-stationary die member 19 to complete the formation of the sheet 11, as described. As a result of this relative movement between the die members 18 and 19, the upwardly-projecting die pins 28 carried by the die member 19 force the correspondingly-positioned pistons 39 upward with respect to their respective cylinders 34, it being understood that this relative movement is due to the fact that the pistons now remain stationary while their cylinders 34 continue to move downward. Such retraction of the pistons compresses the pressurized fluid in these cylinders and this compressed fluid acts as a cushion for the die pins. Because the cylinders 34 are all interconnected by the passages 42 and 45, the pressure surges in the cylinders which have relatively upwardly-moving pistons are distributed to the other cylinders, in which the pistons are not moving relatively upward because of the absence of die pins 28 thereat. That is, the cylinders 34 which are at locations where a die pin is not present act as surge/compression chambers for the cylinders whose pistons are being acted upon by die pins. In virtually every case, the "inactive" cylinders (where the die pins 28 are absent) will out-number the "active" cylinders (where die pins are present), and the total volume of these inactive cylinders will enable the pressure surges to be absorbed without requiring special surge tanks, as in prior adapter cushions for use on presses. Also, since the upper plate 31 and the attached manifold plate 44 provide the passages which interconnect the cylinders, no pipes or hoses are required for this purpose.

With the above-described construction of the present adapter cushion, no pressure plate for engagement with the die pins is required and therefore there can be no problem due to tilting of the pressure plate because of unevenly distributed die pins. Accordingly, when the present adapter cushion is used, the die pins can have any desired distribution because this does not affect the operation of the cushion. Also, the elimination of the pressure plate enables a longer working stroke of the pistons for a given vertical thickness of the complete cushion assembly. A further advantage of the present adapter cushion is that it does not require castings or patterns and can be made to any desired size relatively quickly and inexpensively.

While a presently-preferrred embodiment of the present adapter cushion has been described in detail and shown in the accompanying drawings for cushioning the pressure pad in the upper die assembly of a press, it is to be understood that the present invention is susceptible of other structural embodiments and is not limited to the particular construction shown and may be used in a different manner, such as for cushioning the lower die in a press. Accordingly, it is my intention to cover hereby all adaptations, modifications and uses of the present adapter cushion which come within the scope of the appended claims.

Having described my invention, I claim:

1. An adapter cushion for a press or the like having separable die means for forming a workpiece, and die pins projecting from said die means on centers spaced apart from each other by a predetermined distance or a multiple thereof, said adapted cushion comprising: a plurality of cylinder-and-piston units positioned in a grid-like pattern on centers spaced apart from each other by said predetermined distance, each of said cylinder-and-piston units (comprising a cylinder for receiving pressurized fluid and a piston) having a movable part with an exposed portion located substantially on the axis of said unit and located at a respective center in said grid-like pattern to be positioned by pressurized fluid in said unit for engagement by a respective die pin to be displaced by the latter against said pressurized fluid in response to the closing of said die means.

2. An adapter cushion according to claim 1, and further comprising plate means supporting the cylinder-and-piston units and formed with a plurality of passages interconnecting the cylinders of said units.

3. An adapter cushion for a press or the like having separable die means for forming a workpiece, and die pins projecting from said die means on centers spaced apart from each other by a predetermined distance or a multiple thereof, said adapter cushion comprising: a plurality of cylinder-and-piston units, and plate means rigidly supporting said units on centers spaced apart in succession by said predetermined distance, with a cylinder-and-piston unit being positioned at each possible location for a die pin, each of said cylinder-and-piston units comprising a cylinder having an opening for receiving pressurized fluid and a movable piston having an exposed central portion located at the respective center, said piston being positioned by the pressurized fluid for engagement of its exposed central portion by a respective die pin to be displaced by the latter against said pressurized fluid in response to the closing of said die means.

4. An adapter cushion according to claim 3, wherein said plate means has a plurality of passages interconnecting said openings in the cylinders.

5. An adapter cushion according to claim 3, wherein said support means comprises a pair of plates respectively receiving and rigidly supporting the opposite ends of the cylinders, the plate which is to be positioned toward said die pins having openings at said cylinders, and said pistons having their respective exposed central portions aligned with said openings for engagement by the respective die pins.

6. An adapter cushion for a press or the like having separable die means for forming a workpiece, and die pins projecting from said die means on centers spaced apart from each other by a predetermined distance or a multiple thereof, said adapter cushion comprising: plate means having a plurality of openings arranged in a grid-like pattern on centers spaced apart from each other by said predetermined distance, and a cylinder-and-piston unit at each of said last-mentioned centers, each cylinder-and-piston unit comprising a piston and a cylinder slidably receiving said piston and having an opening at one side of said piston for receiving pressurized fluid, said piston having an exposed portion located at the respective center on the opposite side from said cylinder opening, said piston being positioned by the pressurized fluid for engagement of its exposed portion by a respective die pin to be displaced by the latter against said pressurized fluid in response to the closing of said die means.

7. An adapter cushion for a press or the like having separable die means for forming a workpiece, and die pins projecting from said die means on centers spaced apart from each other by a predetermined distance or a multiple thereof, said adapter cushion comprising: a plurality of cylinder-and-piston units on centers spaced apart in succession by said predetermined distance, each of said units comprising a cylinder having an opening for receiving pressurized fluid and a piston positioned by said pressurized fluid to be engaged by a respective die pin and to be displaced thereby against the pressurized fluid in the cylinder in response to the closing of said die means, and passage means interconnecting said cylinders and enabling any cylinders which are located where a die pin is not present to provide surge/compression chambers for the fluid displaced by those pistons which are engaged by respective die pins.

8. An adapter cushion according to claim 7, and further comprising a pair of vertically spaced plates respectively receiveing the upper and lower ends of the cylinders of said units, the plate which is to be positioned farther away from said die pins than the other plate having passages therein interconnecting (the corresponding ends of) said openings in the cylinders.

9. An adapter cushion according to claim 8, wherein said other plate has openings at said cylinders, and each of said pistons has an exposed central portion aligned with the respective last-mentioned opening for engagement by the respective die pin.

10. An adapter cushion according to claim 9, wherein said other plate receives a spanner nut at each of said last-mentioned openings which engages and supports the adjacent end of the respective cylinder and provides a limit stop against which the respective piston is urged by pressurized fluid.

11. An adapter cushion according to claim 7, wherein said cylinder-and-piston units are arranged in a plurality of rows, with the units in each row being on centers spaced apart from one another by said predetermined distance and with the successive rows being spaced apart from each other by said predetermined distance, said adapter cushion further comprising a plate engaging the ends of the cylinders which are remote from the die pins, said plate having a passage extending along each row of said cylinder-and-piston units and in fluid communication with said opening for each cylinder in the respective row, and means interconnecting said last-mentioned passages.

12. An adapter cushion according to claim 11, wherein said last-mentioned means comprises a plurality of manifold plates arranged end-to-end and attached respectively to said first-mentioned plate at one end of each of said passages therein, said manifold plates having registering passages which together provide a manifold passage connected to each of said passages in said first-mentioned plate.

13. An adapter cushion according to claim 12, wherein each of said manifold plates is individually detachable from said first-mentioned plate to permit testing of the cylinders in the corresponding row for leakage.

References Cited

UNITED STATES PATENTS 3,064,507   11/1962   Strugala _____ 78—42

FOREIGN PATENTS 544,624   4/1942   Great Britain.

CHARLES W. LANHAM, Primary Examiner

U.S. Cl. X.R.

72—453

PO-1050
(5/69)

UNITED STATES PATENT OFFICE
CERTIFICATE OF CORRECTION

Patent No. 3,457,765     Dated July 29, 1969

Inventor(s) Elmer F. Heiser

It is certified that error appears in the above-identified patent and that said Letters Patent are hereby corrected as shown below:

In the claims:

Column 6, lines 13 and 14 after "units" in line 13, delete the words in parentheses which are "(comprising a cylinder for receiving pressurized fluid and a piston)"

Column 7, line 18, after "interconnecting" delete the words in parentheses which are "(the corresponding ends of )"

SIGNED AND
SEALED
JAN 27 1970

(SEAL)
Attest:

Edward M. Fletcher, Jr.
Attesting Officer

WILLIAM E. SCHUYLER, JR.
Commissioner of Patents